United States Patent [19]

Wallis

[11] Patent Number: 5,172,892
[45] Date of Patent: Dec. 22, 1992

[54] SELF CONTAINED GAS SPRING

[76] Inventor: Bernard J. Wallis, 2215 Dacosta, Dearborn, Mich. 48128

[21] Appl. No.: 783,206

[22] Filed: Oct. 28, 1991

[51] Int. Cl.5 .............................................. F16F 5/00
[52] U.S. Cl. .................. 267/119; 267/64.28; 267/130
[58] Field of Search .............. 267/64.28, 119, 124, 267/130; 188/322.21

[56] References Cited

U.S. PATENT DOCUMENTS

| 3,079,897 | 3/1963 | Kirsch | 267/119 |
| 3,279,781 | 10/1966 | Rumsey | 267/64.28 |
| 3,281,138 | 10/1966 | Oster | 267/64.28 |
| 3,694,111 | 9/1972 | Braun | 267/124 |
| 4,550,899 | 11/1985 | Holley | 267/130 |
| 4,664,362 | 5/1987 | Hennells | 267/119 |
| 4,742,997 | 5/1988 | Wallis | 267/119 |
| 4,815,718 | 3/1989 | Kadis | 267/130 |

FOREIGN PATENT DOCUMENTS 2188698 10/1987 United Kingdom ............ 267/64.28

Primary Examiner—Robert J. Oberleitner
Assistant Examiner—Chris Schwartz
Attorney, Agent, or Firm—Barnes, Kisselle, Raisch, Choate, Whittemore & Hulbert

[57] ABSTRACT

A self contained gas spring comprising a housing having a closed end and an open end, and a cylindrical bore. A cylindrical sleeve is inserted into the bore of the housing. The sleeve has at least a portion thereof forming an internal cylindrical surface. A piston rod has a piston within the cylindrical surface. The sleeve defines a space between the sleeve and the bore of the housing. This space communicates with the space of said cylindrical surface at the piston end of the piston rod. A charging valve is provided in the closed end of said housing for charging the space at the piston end of said piston rod and the space between the sleeve and the housing with gas under pressure. Preferably, the die cylinder includes sufficient volumetric space such that the pressures in the self contained gas spring do not increase substantially during the movement of the piston within the cylinder.

2 Claims, 2 Drawing Sheets

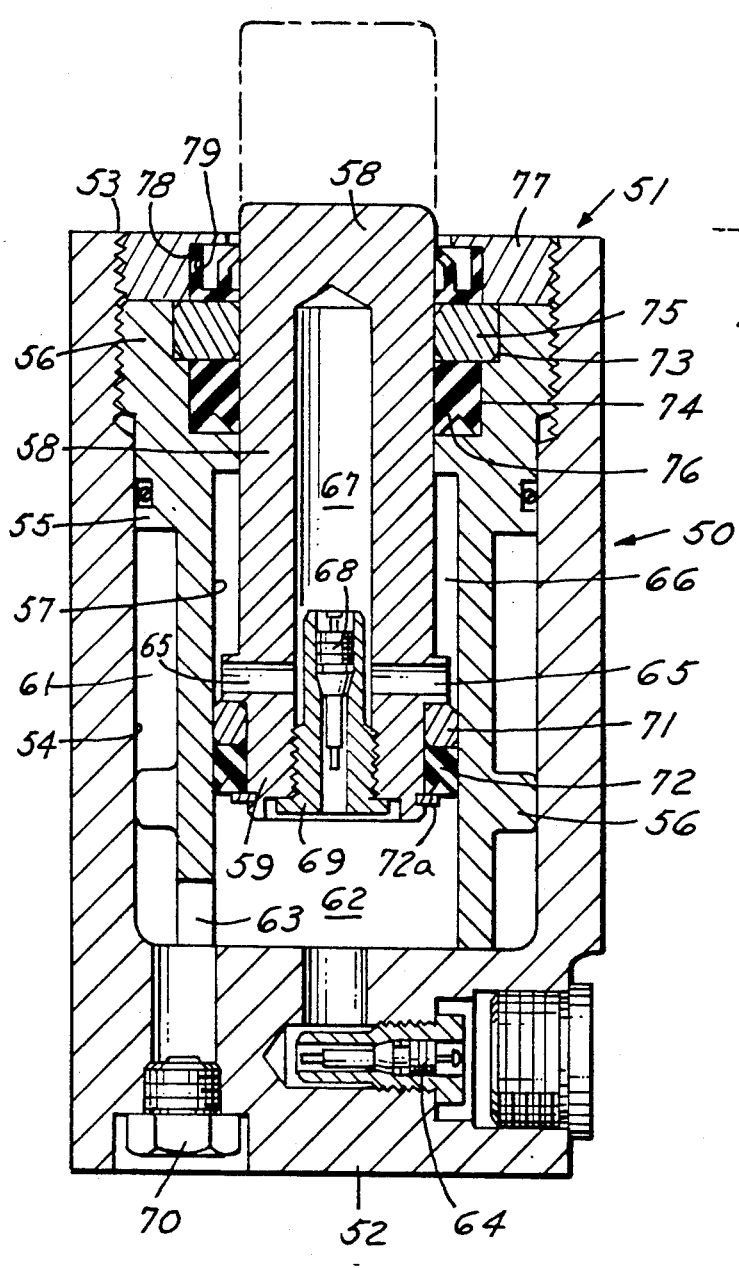
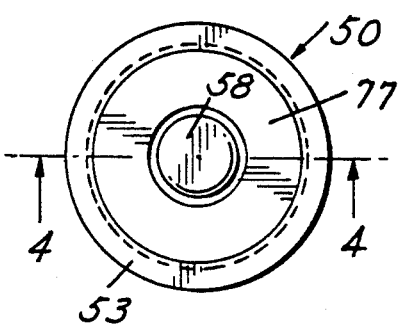
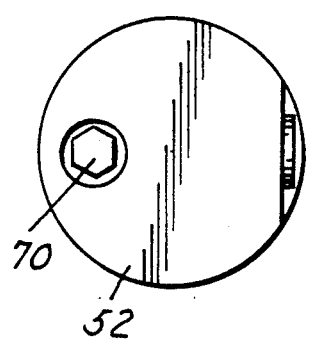

SELF CONTAINED GAS SPRING

BACKGROUND AND SUMMARY OF THE INVENTION

In presses and dies, it has been common to utilize die cylinders which communicate with a manifold and function as die springs. It has also been suggested that self contained gas springs be provided as shown in U.S. Pat. Nos. 4,742,997 and 4,741,518.

A major consideration in connection with the design of the self contained gas springs is that when charged with gas, such as nitrogen, at high pressures on the order of 1000 p.s.i., the normal stroke of the piston therein substantially increases the pressure. Accordingly, the construction of the self contained die cylinder must be constructed to withstand such high pressures. This results in the need to increase the geometric spaces in which the die cylinders are used. It has thus been customary to compromise the design.

Among the objectives of the present invention are to provide a self contained gas spring which is functional or operation at relatively high pressures; but which does not increase substantially during the movement of the piston within the cylinder which is compact; and which requires a minimum of maintenance.

In accordance with the invention, a self contained gas spring comprising a housing having a closed end and an open end, and a cylindrical bore. A cylindrical sleeve is inserted into the bore of the housing. The sleeve has at least a portion thereof forming an internal cylindrical surface. A piston rod has a piston within the cylindrical surface. The sleeve defines a space between the sleeve and the bore of the housing. This space communicates with the space of said cylindrical surface at the piston end of the piston rod. A charging valve is provided in the closed end of said housing for charging the space at the piston end of said piston rod and the space between the sleeve and the housing with gas under pressure. Preferably, the die cylinder includes sufficient volumetric space such that the pressures in the self contained gas spring do not increase substantially during the movement of the piston within the cylinder.

DESCRIPTION OF THE DRAWINGS

FIG. 4 is a sectional view of a modified form of gas spring taken along the line 4—4 in FIG. 3.

FIG. 5 is a top view of the gas spring shown in FIG. 4.

FIG. 6 is a bottom view of a gas spring.

DESCRIPTION

Figure 1:
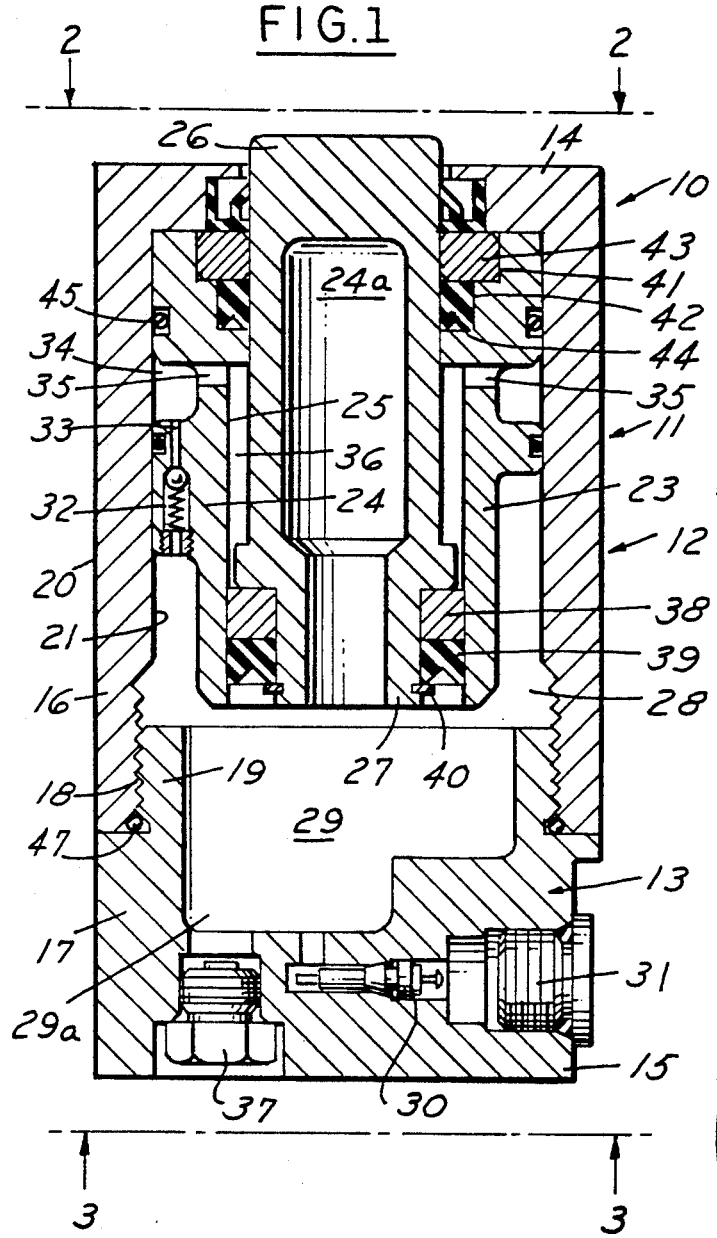
FIG. 1 is a sectional view of a gas spring embodying the invention.
Figure 2:
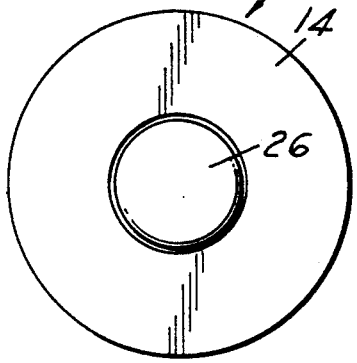
FIG. 2 is a top view taken along the line 2—2 in FIG. 1.
Figure 3:
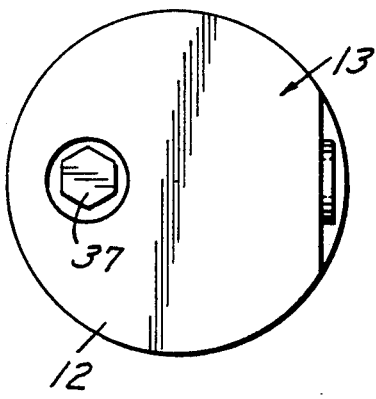
FIG. 3 is a bottom view of the gas spring taken along the line 3—3 in FIG. 1.

In accordance with the invention, a self contained gas spring 10 comprises a housing 11 having a closed end and in the form of a cylinder comprising two generally cylindrical sections 12, 13 having end walls 14, 15 and cylindrical wall 16, 17. Cylindrical wall 16 has an internal thread 18 which engages an external thread 19 on a cylindrical projection on wall 17 to define the die cylinder housing 11, which has a cylindrical exterior surface 20.

The wall 16 further includes a cylindrical bore 21. A cylindrical sleeve 22 is inserted into the housing section 12 and has a portion 23 abutting end wall 14. The sleeve 22 has at least a portion 24 thereof forming a cylindrical surface 25. A piston rod 26 includes a piston 27 within said cylindrical surface 25. The sleeve 22 cooperates with the housing defines a space 28 between the sleeve 22 and the bore 21 of the housing section 16. The space 28 communicates with the space 29 at the piston end 27 of the piston rod 26 through an axial passage 33 in the sleeve 15. A charging valve 30 is provided in the closed end of said housing section 17 and extends radially inwardly for charging the space 29 at the piston end 27 of said piston rod 26 and the space 28 between the sleeve 22 and the housing section 16 with gas under pressure. A removable plug 31 is threaded into the housing so that the valve 30 is protected from contaminants.

As shown in FIG. 1, the space 29 includes an enlarged volume space 29a which functions to provide sufficient volume, together with spaces 28 and an axial space 24a in piston 27 to preclude excessive increase in pressure as the pressure increases by movement of the piston 26 downwardly as viewed in FIG. 1.

A spring loaded ball type pressure relief valve 32 is provided in a radial flange 33 on sleeve 23 and communicates with space 34 above flange 33 and through radial openings 35 in the sleeve 23 to an annular space 36 between the piston rod 26 and the sleeve 23. These spaces 34, 36 are normally not pressurized but the valve 32 functions to relieve pressure therein in the event gas leaks into these spaces 34, 36.

The gas spring further includes a safety rupture plug 37 that communicates with the annular space 29 defined by the sleeve 15.

The piston 27 is provided with an annular guide bearing 38 and a U-cup seal 39 that are retained by snap ring 40 against the shoulder on the piston rod. Similarly, the portion 23 of sleeve 22 is provided with annular recesses 41, 42 for a guide bearing 43 and a U-cup seal 44. An O-ring seals 45, 46 is provided on the sleeve 23 and an O-ring seal 47 is provided at the juncture of the cylindrical sections 16, 17.

In the modified form shown in FIGS. 4–6, the self contained gas spring 50 comprises a housing 51 having a closed end 52 and an open end 53. The housing 51 has a cylindrical bore 54. A cylindrical sleeve 55 is inserted into the housing section 51 and has a portion 56 thereof threaded into a complementary threaded end of the bore 54. The sleeve 55 has at least a portion thereof forming a cylindrical surface 57. A piston rod 58 includes a piston 59 engages the cylindrical surface 57. The sleeve 55 has radially inwardly extending flange 60 limiting axially outward movement of the rod 58 relative to the housing 51. The sleeve 55 defines a space 61 between the sleeve 55 and the bore 54 of the housing 51. The space communicates with the space 62 of said cylindrical surface at the piston end 59 of the piston rod 58 through a recess 63 in the sleeve 55. A charging valve 64 is provided in the closed end of said housing section 51 for charging said space at the piston end of said piston rod 58 and the space 61 between the sleeve 55 and the housing 51 with gas under pressure.

The gas spring further includes a plurality of radial passages 65 in the piston rod 58 spaced axially from the free end of the piston rod and providing communication to an annular space 56 that is normally not pressurized. The inner ends of the passages communicating with an axial space 67 that is also not pressurized. A pressure relief valve 68 is provided in a plug 69 in the piston end of the piston rod 58 and functions to relieve pressure in the unpressurized spaces 66, 67. The gas spring further includes a safety rupture plug 70 that communicates with the annular space 61 defined by the sleeve 55.

The piston rod 58 is provided with an annular guide bearing 71 and a U-cup seal 72 that are retained by snap ring 72a against the shoulder on the piston rod 58. Similarly, the sleeve 55 is provided with annular recesses 73, 74 for a guide bearing 75 and a U-cup seal 76. A lock nut 77 is threaded into the housing and engages the free end of the sleeve 55 to axially restrain the sleeve 55. The lock nut 77 includes an annular seat 78 for a rod wiper-scraper seal 79.

It can thus been seen that there has been provided a self contained gas spring which is functional or operation at relatively high pressures; but which does not increase substantially during the movement of the piston within the cylinder which is compact; and which requires a minimum of maintenance.

I claim:

1. A self contained gas spring comprising
a housing having a closed end and an open end,
said housing having a cylindrical bore,
a cylindrical sleeve inserted into said housing,
said sleeve having at least a portion thereof forming a cylindrical surface,
a rod including a piston within said cylindrical surface,
means limiting axially outward movement of said rod relative to said housing,
said sleeve defining a first space between said sleeve and said bore of said housing,
a second space between said piston and said housing,
a charging valve in said closed end of said housing for charging said second space at the piston end of said piston rod and said first space between the sleeve and the housing with gas under pressure,
a third space between said sleeve and said piston rod axially above said piston,
a one-way valve means on said sleeve functioning to permit passage of pressurized gas from said third space to said second space in the event gas leaks into said third space and exceeds the pressure in said second space.

2. The self contained gas spring set forth in claim 1 wherein each of said piston and said sleeve includes a guide bearing and a cup seal, said guide bearing and cup seal on said piston engaging said cylindrical surface of said sleeve, said guide bearing and cup seal on said sleeve engaging said piston rod.

* * * * *